United States Patent [19]

Abe et al.

[11] Patent Number: 4,964,983

[45] Date of Patent: Oct. 23, 1990

[54] RESERVOIR

[75] Inventors: Ryutaro Abe, Toyokawa; Yoshiyuki Takeuchi, Gamagori; Kouichi Shibata, Okazaki, all of Japan

[73] Assignee: Toyoda Koki Kabushiki Kaisha, Kariya, Japan

[21] Appl. No.: 434,258

[22] Filed: Nov. 13, 1989

[30] Foreign Application Priority Data

Nov. 21, 1988 [JP] Japan .................. 63-294181

[51] Int. Cl.⁵ .............................................. B01D 33/00
[52] U.S. Cl. ...................................... 210/168; 210/305
[58] Field of Search ............... 210/168, 310, 305, 247, 210/456

[56] References Cited

U.S. PATENT DOCUMENTS

| | | | |
|---|---|---|---|
| 2,792,119 | 5/1957 | Leonard | 210/304 |
| 2,800,083 | 7/1957 | Tweedale et al. | 103/42 |
| 2,821,140 | 1/1958 | Pettibone | 103/42 |

*Primary Examiner*—Bernard Nozick
*Attorney, Agent, or Firm*—Oblon, Spivak, McClelland, Maier & Neustadt

[57] ABSTRACT

A reservoir used in an automotive power steering system is provided with a first filter disposed within a reservoir body at a location between an inlet and an outlet thereof. The reservoir is further provided with a first guide member for forcing the oil flowed into through the inlet to flow toward the first filter by changing the flow direction of the oil and a second guide member for forcing the oil passed through the first filter to flow toward the outlet by changing the flow direction of the oil. The first guide member is provided with an opening, and a second filter whose mesh is finer than that of the first filter is attached to the opening so as to allow the oil to flow from the inlet to the inside space above the first filter through the second filter. On the other hand, the second guide member is formed with a second opening for allowing the oil passed through the first filter to flow toward the outlet through the second opening.

5 Claims, 4 Drawing Sheets

RESERVOIR

BACKGROUND OF THE INVENTION

1. Field of the Invention:

The present invention relates to a reservoir for reserving oil and having a filter for filtering the oil which flows from its inlet to its outlet.

2. Description of the Prior Art:

In general, a reservoir used in an automotive power steering system is provided with an inlet connected to a servovalve of the power steering system and an outlet connected to a pump of the power steering system. In such reservoir, a filter is attached within the reservoir at a location between the inlet and the outlet so as to filter the oil flowing from the inlet to the outlet.

There is a problem in such reservoir that the oil does not flow through the filter smoothly under low temperature environments, because the viscosity of the oil becomes higher in such environments. Under such environments, the flow resistance within a hose connecting the reservoir and the pump also becomes higher than that under normal operation temperatures. As a result, the oil cannot be sufficiently supplied to the pump under such low temperature environments, so that a cavitation tends to be generated in the pump due to the insufficiency of the oil supply. The cavitation causes the pump to produce odd sounds. Although many methods have been tried to reduce the odd sounds, sufficient results have not been obtained.

SUMMARY OF THE INVENTION

Accordingly, it is an object of the present invention to provide an improved reservoir capable of supplying sufficient amount of oil to a pump even under low temperature environments. Another object of the present invention is to provide an improved reservoir capable of assisting oil to flow through a filter of the reservoir and a hose connecting the reservoir and a pump, by using the energy of the oil flowing into through the inlet.

Briefly, according to the present invention, there is provided a reservoir having a filter disposed between an inlet and an outlet, wherein a first guide member is attached within the reservoir so as to force the oil flowed into through the inlet to flow toward the filter. Moreover, a second guide member is attached within the reservoir so as to force the oil passed through the filter to flow toward the outlet. With this arrangement, the oil flowed into the reservoir is compulsorily fed into the outlet, so that sufficient amount of oil can be supplied to a pump even under low temperature environments.

BRIEF DESCRIPTION OF THE ACCOMPANYING DRAWINGS

Various other objects, features and attendant advantages of the present invention will readily be appreciated as the same becomes better understood by reference to the following detailed description of a preferred embodiment when considered in connection with the accompanying drawings, in which.

DETAILED DESCRIPTION OF THE PREFERRED EMBODIMENT

Figure 1:
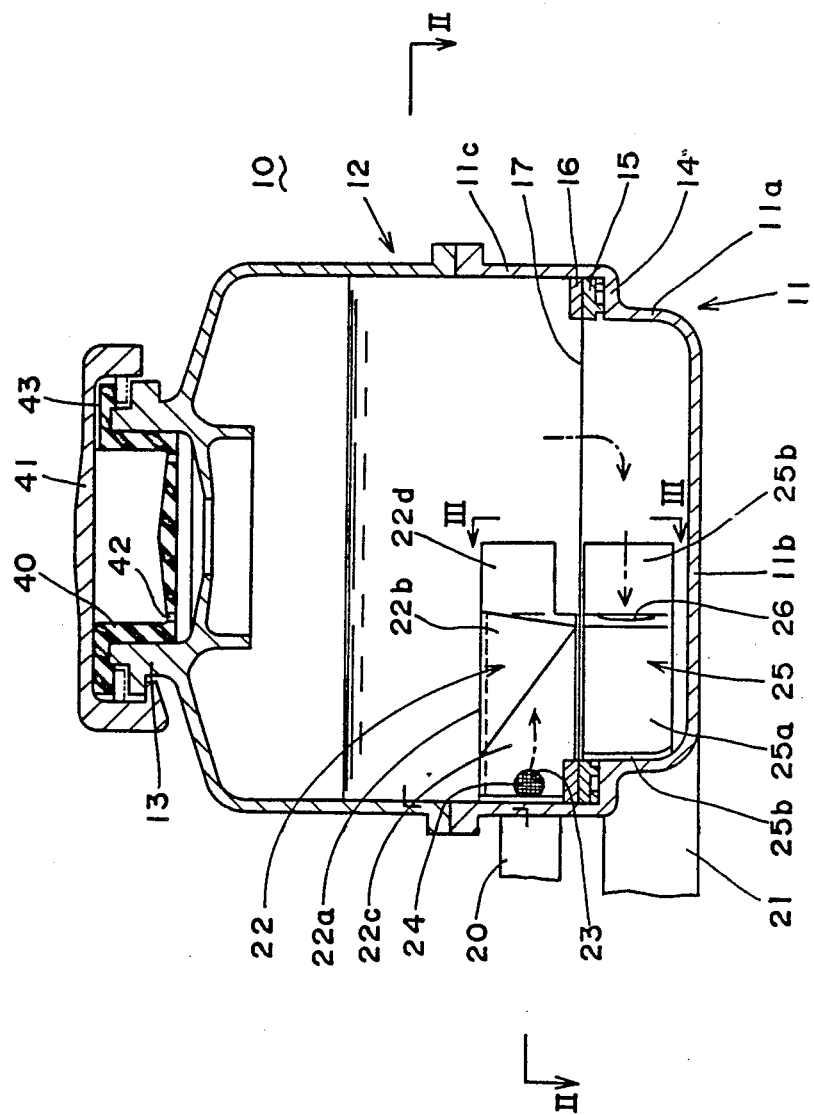
FIG. 1 is a sectional view of a reservoir according to the present invention.

Referring now to the drawings and more particularly to FIG. 1 thereof, reference numeral 10 denotes a synthetic resinous reservoir of cylindrical shape for containing oil therein. The reservoir 10 is composed of a lower body 11 having a cup shape, and an upper body 12 having an opening portion 13 for attaching a cap 41 thereto. The lower body 11 is formed with a small diameter portion 11a having a circular bottom 11b and a large diameter portion 11c extending upward from the small diameter portion 11a, and a seat portion 14 of ring shape is formed therebetween. A first filter 17 supported by a pair of ring members 15 and 16 is attached on the seat portion 14.

Figure 2:
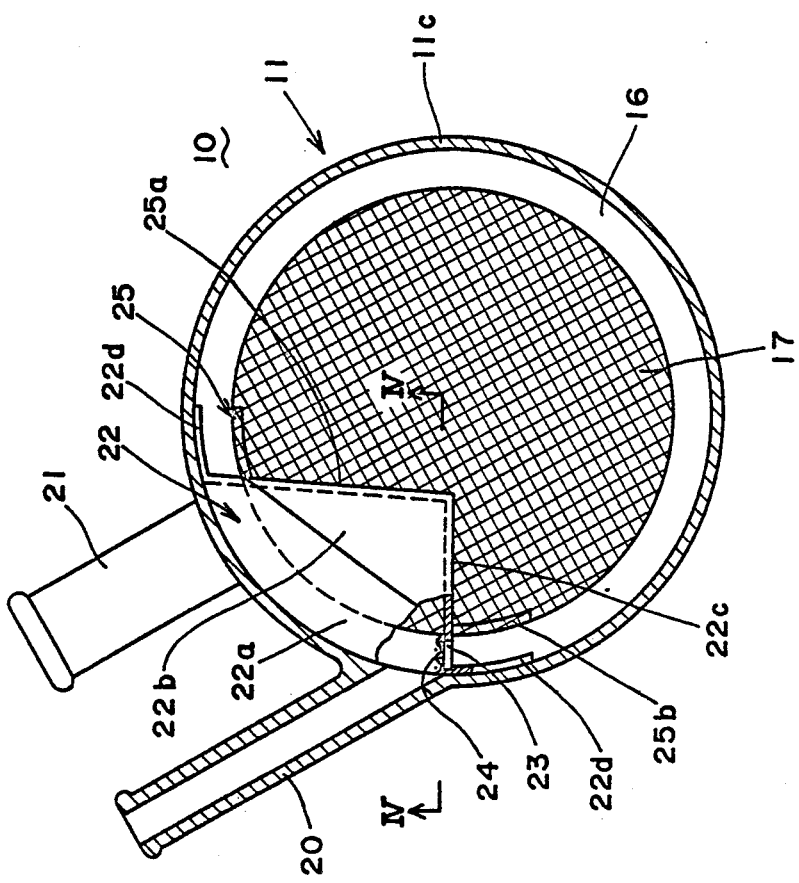
FIG. 2 is a sectional view taken along the line II—II in FIG. 1.

The large diameter portion 11c of the lower body 11 is formed with an inlet 20 projected from the periphery of the large diameter portion 11c of lower body 11, as shown in FIG. 2, and the inner end of the inlet 20 opens into the inside space of the lower body 11 at a location above the first filter 17. The outer end of the inlet 20 is connected to the servovalve of an automotive power steering system (not shown) through a connecting pipe (not shown) through which oil is returned from the servovalve. On the other hand, an outlet 21 is projected along a direction parallel to the inlet 20 from the periphery of the small diameter portion 11a of the lower body 11, and the inner end of the outlet 21 opens into the inside space of the lower body 11 at a location under the first filter 17. The outer end of the outlet 21 is connected to a pump (not shown) of the power steering system through a pipe (not shown) through which the oil is supplied to the pump.

Moreover, a first guide member 22 is attached to the inner surface of the large diameter portion 11c of the lower body 11 at a vertical location corresponding to that of the inlet 20. The first guide member 22 is formed with an upper plate portion 22a extending in circumferential direction from a location facing the inlet 20 to a location facing the outlet 21, an inclined portion 22b of triangle shape extending from the inner side of the upper plate portion 22a and inclining downward with a predetermined angle, a side plate portion 22c of reversed L-shape extending downward from the upper plate portion 22a and the inclined portion 22b, and attaching portions 22d, 22d projecting from both circumferential ends of the side plate portion 22c. The first guide member 22 is attached to the large diameter portion 11c of the lower body 11 through the attaching portions 22d, 22d such that the upper flat portion 22a is located above the inner open end of the inlet 20. Furthermore, the side plate portion 22c is provided with an opening 23 formed at a location near the inner open end of the inlet 20, and a second filter 24 whose mesh is finer than that of the first filter 17 is attached to the opening 23.

Figure 3:
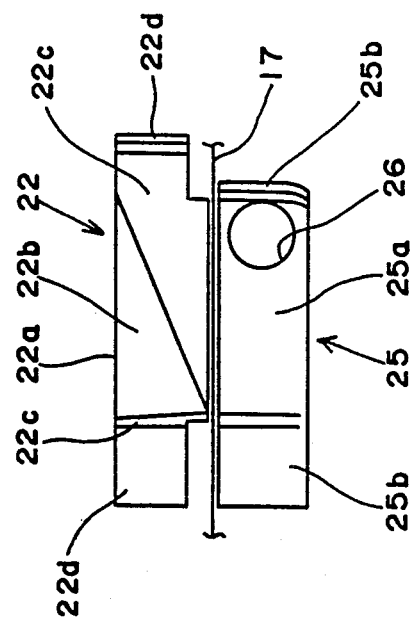
FIG. 3 is a view taken along the line III—III in FIG. 1.

On the other hand, a second guide member 25 is attached to the inner surface of the small diameter portion 11a of the lower body 11 at a vertical location corresponding to that of the outlet 21. The second guide member 25 is formed with a side plate portion 25a having the almost same shape and same size as those of the side plate portion 22c of the first guide member 22, and attaching portions 25b, 25b formed at both circumferential ends of the side plate portion 25a. The side plate portion 25a is provided with a second opening 26 formed at a location near the inner open end of the outlet 21, as shown in FIG. 3. The second guide member 25 is attached in such a way that the upper end of the side plate portion 25a faces the lower end of the side plate portion 22c of the first guide member 22.

At the opening portion 13 of the reservoir 10, a rubber packing 40 and the cap 41 are removably attached, and the rubber packing 40 is provided with a small hole 42 and a groove 43 so as to connect the inside space above the first filter 17 and the outside of the reservoir 10.

Figure 4:
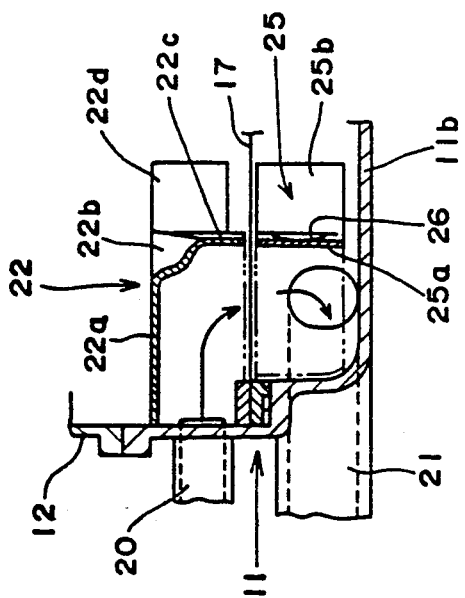
FIG. 4 is sectional view taken along the line IV—IV in FIG. 2.

The operation of the reservoir will be now described. The oil returned from the servovalve flows into the reservoir 10 through the inlet 20, and then flows along the upper plate portion 22a, the inclined plate portion 22b and the side plate portion 22c of the first guide member 22 toward the first filter 17, as indicated by an arrow with a solid line in FIG. 4. As a result, the flow direction of the oil is changed from a horizontal direction to a downward direction with maintaining the speed of the oil flowed into the reservoir 10 so that the oil smoothly passes through the first filter 17 even under low temperature environments. After that, the oil flows along the side plate portion 25a of the second guide member 25 and the bottom 11b of the lower body 11 toward the outlet 21 with maintaining the speed of the oil passed through the first filter 17, and then flows to the suction port of the pump through the outlet 21 and the pipe. Under such low temperature environments, the returned oil hardly flows to the inside space above the first filter 17 through the second filter 24, because the second filter 25 is finer than the first filter 17.

As explained above, since the first and second guide members 22 and 25 forces the returned oil to flow through the first filter 17 and then flows into the outlet 21, the pressure of the oil flowing into the outlet 21 is increased by the energy of the returned oil, so that sufficient amount of oil can be supplied to the pump even under low temperature environments. As a result, it is possible to prevent the pump from producing strange sounds, which is produced due to insufficiency of oil supply to the pump.

After the temperature of the oil increases to a normal operation temperature, the oil returned through the inlet 20 mainly flows to the inside space above the first filter 17 through the second filter 24 as indicated by an arrow with a broken line in FIG. 1. After that, the oil flows through the first filter 17 and then to the outlet 21 through the opening 26 of the second guide member 25. Since the inside space above the first filter 17 is connected to the outside of the reservoir 10 through the hole 42 and the groove 43, the air contained in the returned oil is removed during the time when the oil exists above the first filter 17. Therefore, the reservoir 10 can also prevent the pump from producing a strange sound which is produced due to the air contained in the oil.

The shapes of the first and second guided members 22 and 25 can be changed to other shapes having the same function as that of the first and second guide members 22 and 25.

Obviously, numerous modifications and variations of the present invention are possible in light of the above teachings. It is therefore to be understood that within the scope of the appended claims, the invention may be practiced otherwise than as specifically described herein.

What is claimed is:

1. A reservoir for reserving oil comprising:
   a reservoir body provided with an inlet and an outlet formed at different locations;
   a first filter disposed between said inlet and said outlet for filtering oil flowing from said inlet to said outlet;
   a first guide member for forcing the oil flowed into through said inlet to flow toward said first filter; and
   a second guide member for forcing the oil passed through said first filter to flow toward said outlet.

2. A reservoir as set forth in claim 1, wherein said first guide member is provided with an inclined portion facing the inner open end of said inlet and inclining downward with a predetermined angle and a side portion extending downward from said inclined portion for changing the flow direction of the oil flowed into through said inlet to a direction toward the filter; and said second guide member is formed with a side portion for changing the flow direction of the oil passed through said first filter to a direction toward the inner open end of said outlet, together with a bottom surface of said reservoir body.

3. A reservoir as set forth in claim 2, wherein said first guide member is provided with an opening connecting between inside and outside of said first guide member, and a second filter attached to said opening for enabling the oil to flow from said inlet to an inside space above said first filter through said second filter.

4. A reservoir as set forth in claim 3, wherein said second filter has a mesh finer than that of said first filter.

5. A reservoir as set forth in claim 3, wherein said second guide member is provided with a second opening connecting between inside and outside of said second guide member for allowing the oil passed through said first filter to flow toward the inner open end of said outlet through said second opening.

* * * * *